United States Patent [19]
Koske et al.

[11] 3,986,029
[45] Oct. 12, 1976

[54] METHOD FOR CONTROLLING URANIUM ENRICHMENT SYSTEMS

[75] Inventors: Peter Hans Koske, Kiel-Schilksee; Gerhard Langbein, Oberuldingen, both of Germany

[73] Assignee: URANIT Uran-Isotopentrennungs-GmbH, Julich, Germany

[22] Filed: May 23, 1975

[21] Appl. No.: 580,520

Related U.S. Application Data

[63] Continuation-in-part of Ser. No. 360,006, May 14, 1973, abandoned.

[52] U.S. Cl. ............................................. 250/336
[51] Int. Cl.² ......................................... G01T 1/16
[58] Field of Search.................. 250/303, 304, 336; 23/232 C, 254 E

[56] References Cited
UNITED STATES PATENTS 3,226,197 12/1965 Lewis.................................. 250/303
3,590,247 6/1971 Holford............................. 250/304

*Primary Examiner*—Davis L. Willis
*Attorney, Agent, or Firm*—Spencer & Kaye

[57] ABSTRACT

A method for controlling the operation of uranium enrichment systems in which gaseous uranium compounds are processed. The method comprises separating at one or a plurality of precipitation points in the system the process uranium gas and/or its secondary products in small quantities, measuring the radioactive radiation of the separated uranium gas and/or its secondary products, identifying the age of the gas passing through the precipitation points by means of the radioactive radiation measurements and then controlling a parameter of the system with the accumulated data of the process gas and its secondary products.

6 Claims, 4 Drawing Figures

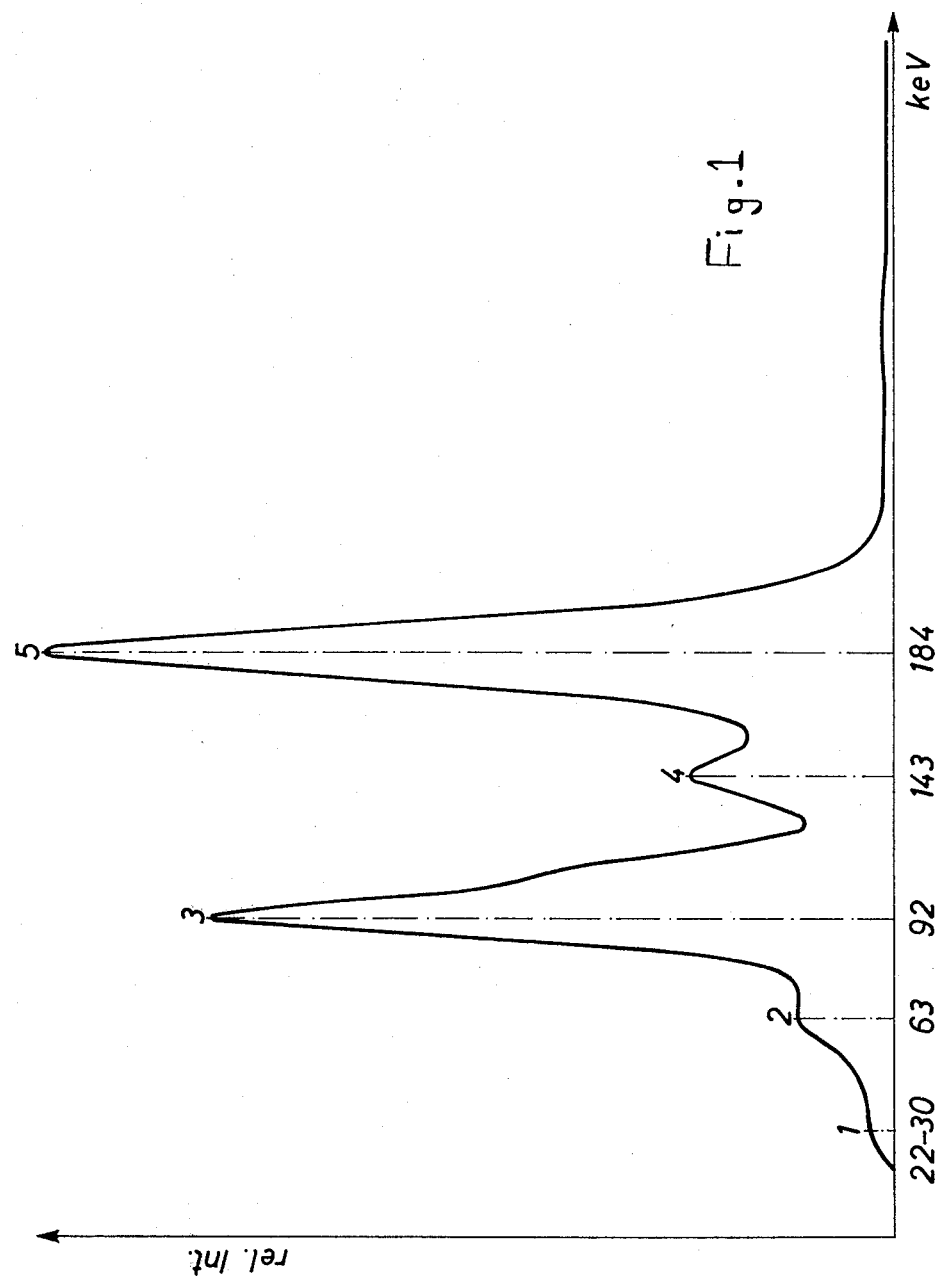

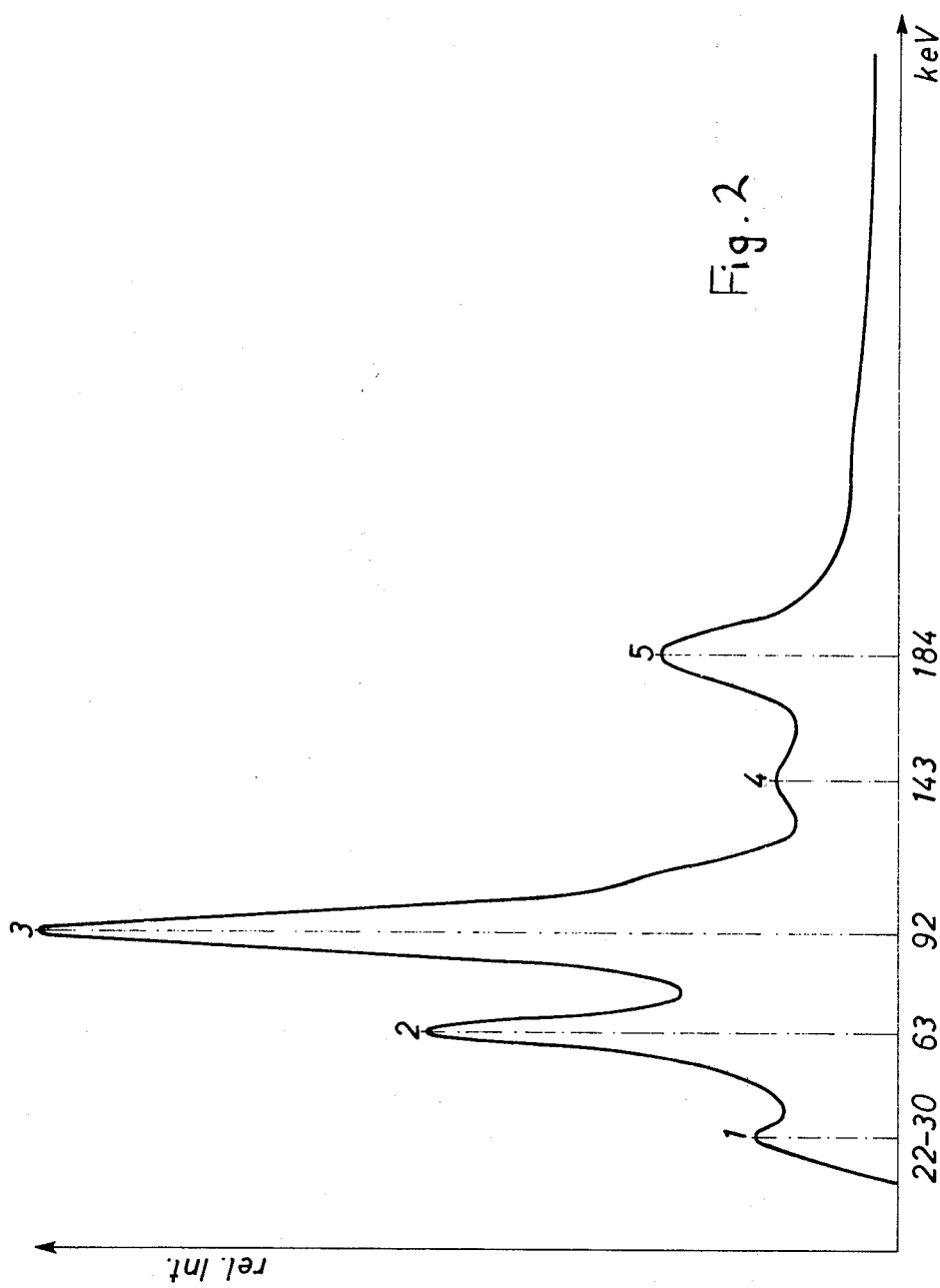

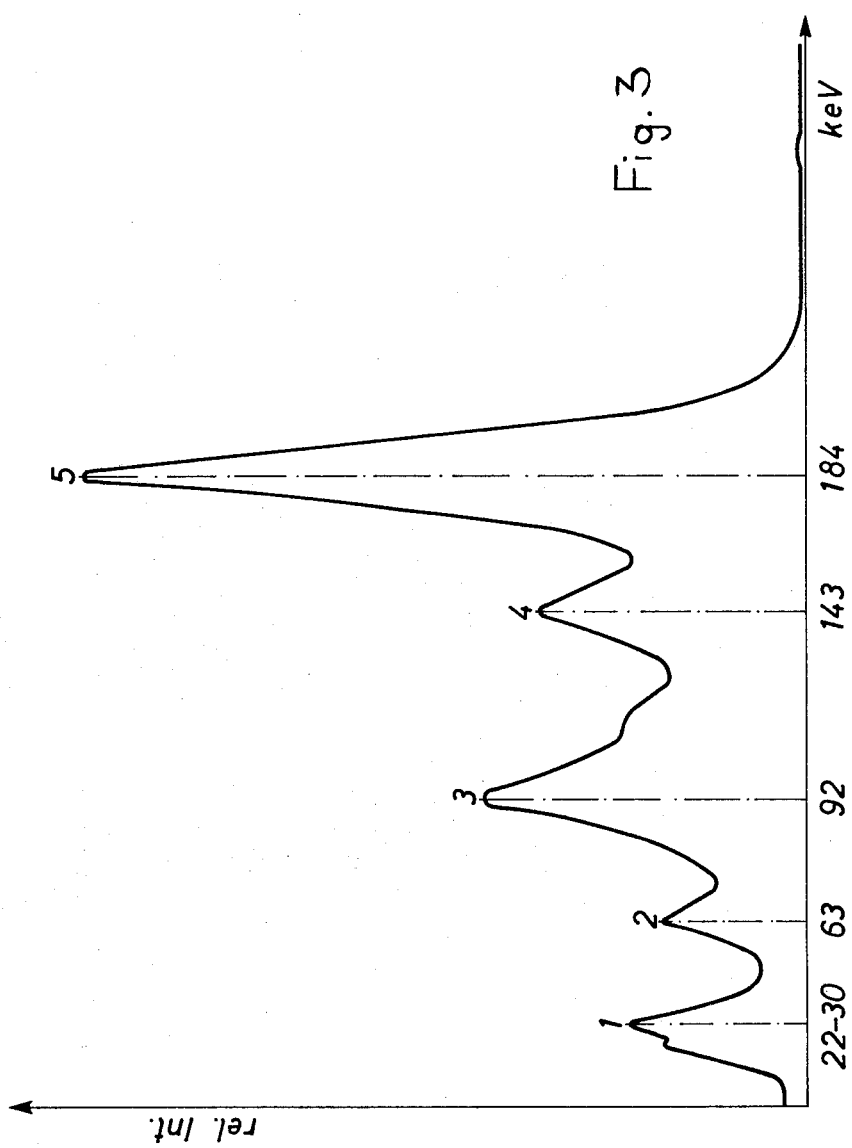

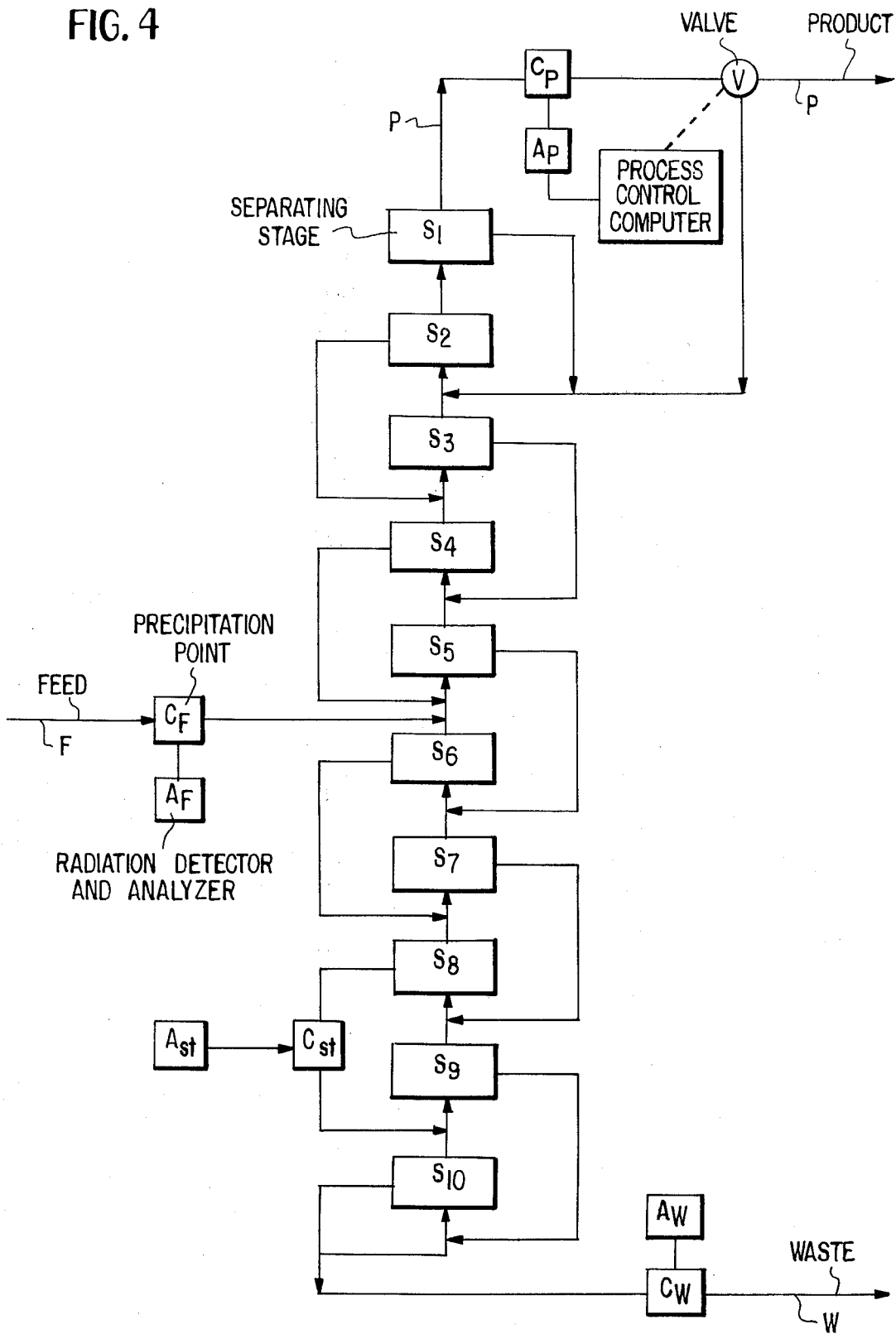

METHOD FOR CONTROLLING URANIUM ENRICHMENT SYSTEMS

CROSS REFERENCE TO RELATED APPLICATION

This application is a continuation-in-part of application Ser. No. 360,006, filed May 14th, 1973 and now abandoned.

BACKGROUND OF THE INVENTION

The present invention relates to a method for controlling the operation of uranium enrichment systems in which the uranium is processed in the form of gaseous compounds.

Such enrichment systems, which may for example include a cascade of separating stages as shown in FIG. 4 of U.S. Pat. No. 2,951,554 issued Sept. 6th, 1960, or in FIG. 4 of U.S. Pat. No. 2,947,472 issued Aug. 2nd, 1960, serve to produce a product which is enriched in uranium 235 with respect to its natural isotope composition. In addition to other control measures, such as volume control, measurements of throughput, and chemical analyses, the degree of enrichment of the operating uranium gas should also be controlled at certain points in the system.

A number of methods are known and have been used to identify the composition of uranium isotope mixtures. The method most commonly used is mass spectrometry. However, it is noted that mass spectrometers are very sensitive instruments which can be operated only by qualified personnel and are not suitable for routine monitoring.

The use of spectrometry, i.e., gamma spectrometry, for determining uranium content is fully outlined and described in various sources of literature such as in C. E. Crouthamel, APPLIED GAMMA-RAY SPECTROMETRY, 2nd edition, page 648, Pergamon Press, 1970; J. Wolff, "Einige Anwendungsmoeglichkeiten der Hochaufloesenden Gamma-Spektroskopie zur Spaltstoffbestimmung", [Several Possible Ways of Using the Highly Resolving Gamma-Spectroscopy for the Determination of Fission Products], Gesellschaft fuer Kernforschung, Karlsruhe, Germany, external report 4/71-33, Mar. 1971 (Institute for Neutron Physics and Reactor Art).

SUMMARY OF THE INVENTION

It is therefore the object of the present invention to provide a method for monitoring the degree of enrichment and the period of dwell of the operating gas flowing through a uranium enrichment system or certain parts of the system, respectively, where the method is practical as well as being operationally dependable and accurate.

This as well as other objects which will become apparent in the discussion that follows, are achieved according to the present invention, by separating at one or a plurality of precipitation points in a uranium enrichment system the process uranium gas ($UF_6$) and/or its secondary products by means of collectors, for example, cooled surfaces or filters, and analyzing these collected products by measuring their radioactive radiation. Then, with the results of this analysis, the age of the uranium gas passing through the system and at its precipitation points is identified. The result of the identification can then be used to control a desired parameter of the system.

BRIEF DESCRIPTION OF THE DRAWINGS

FIG. 1 is the gamma spectrum curve of a freshly sublimed charge of process gas $UF_6$ with a relatively small proportion of secondary products.

FIG. 2 is the gamma spectrum curve of an older charge of process gas $UF_6$ than that shown in FIG. 1, which is saturated with secondary products.

FIG. 3 is the gamma spectrum curve of a charge highly enriched with uranium.

FIG. 4 is a block diagram of the linear cascade type of uranium enrichment system for processing gaseous uranium compounds used to illustrate the method of the invention.

DETAILED DESCRIPTION OF THE PREFERRED EMBODIMENTS

The present invention in controlling and monitoring the degree of enrichment and the period of dwell of the operating uranium gas flowing through an enrichment system, provides a method for collecting, analyzing and controlling the enrichment and period of dwell of the operating gas that passes through the system and its precipitation points.

The method for controlling the enrichment of uranium in the enrichment system includes the steps of initially separating at one or a plurality of precipitation points in the system the process gas $UF_6$ and/or its secondary products, in small quantities by collectors. The collectors that may be used are cooled surfaces for the whole process gas $UF_6$, and filters for the nongaseous secondary products of $UF_6$. Then, the collected products are analyzed and the radioactive radiation of the products is measured. The results of this analysis and radiation measurement are used to identify the age of the gas passing through the system at the collection point or points therein. The separated samples, depending on the isotope composition of the process gas and the period of dwell in the system, usually contain large quantities of the secondary products such as thorium 231 and thorium 234, which is due to the natural radioactivity of the $UF_6$.

The material deposited at the precipitation points in the system is preferably identified by the gamma-spectra of the always radioactive substances. As illustrated in FIGS. 1 – 3, the gamma-spectrum line of thorium 231 and the 63 kiloelectron-Volt (keV) or 92 kiloelectron-Volt (keV) lines, respectively, of thorium 234 as well as the 184 keV line of uranium 235 are particularly suited for this purpose.

In order to use this process, NaI detectors or semiconductor detectors with series connected pulse level analyzers, for example multichannel analyzers, are attached to the collector or precipitation points of the system. The detectors can be arranged to extend into the collectors (e.g. cooling traps for the whole process gas, and filters for the non-gaseous secondary products of $UF_6$) placed at the precipitation points in the system.

In FIGS. 1 and 2, the gamma spectra curves recorded by an NaI detector from two $UF_6$ charges are shown with their natural isotope composition. The gamma spectrum curve of FIG. 1 is derived from a freshly sublimed charge and has a relatively small proportion of secondary products. The gamma spectrum curve of FIG. 2 is derived from an older charge which is already in radioactive equilibrium and is saturated with secondary products. The numerals 1 through 5 in the gamma spectrum curves correspond to the following keV lines:

1: 22–30 keV (thorium 231)
2: 63 keV (thorium 234)
3: 92 keV (thorium 234)
4: 143 keV (uranium 235)
5: 184 keV (uranium 235)

The relative intensities, i.e., pulse levels, of the radioactivities of the process gas and its secondary products are shown on the ordinates. By comparing the gamma spectra curves of FIGS. 1 and 2 it can be seen that the older the charge, the more lines 1, 2 and 3 appear distinct with respect to lines 4 and 5. That is, within the saturation period for uranium of about 28 days, lines 1, 2 and 3 can be used to determine the age of the charge and thus, to control the period of dwell of the charge in the system. That uranium reaches saturation activity in about 28 days is known in the art, see for example, M. Benedict and T. H. Pigford, NUCLEAR CHEMICAL ENGINEERING, MacGraw-Hill Book Company, Inc. (1957), page 133. Within the 28 day saturation period, the relative intensities of the peaks of lines 1, 2 and 3, which are substantially a result of the enrichment of the secondary products of uranium, will change from those shown in FIG. 1 to those shown in FIG. 2. Thus from the ratio of the intensities of the secondary products to the base element, the age of the $UF_6$ charge, beginning with the last sublimation, may be determined. This can be done, for example, by comparing e.g. in a computer, the values of the relative intensities which are measured with standard values determined using the known decay equations for the uranium isotopes and which correspond to various periods of dwell in the system and hence the age of the charge. Alternatively the measured gamma spectrum may be compared with standard calibrating curves, e.g. the curve of FIG. 2 which corresponds to a $UF_6$ change approximately 28 days old and if desired gamma spectrum control curves corresponding to each of the days prior thereto. In this manner, if the measured gamma spectrum which is recorded, for example, at the product output of the enrichment system, deviates from the normal or rated curves, e.g., the curve of FIG. 2 if it is desired that the process gas have a period of dwell of 28 days, it is evident that the process gas, depending on whether the thorium intensities deviate upwardly or downwardly from the normal or desired values, was retained in the system longer or shorter respectively than desired under normal operation. Accordingly the system can then be further controlled to then either permit the process gas to remain in the system i.e., continue its period of dwell, or simply remove the process gas, i.e., terminate its period of dwell.

If the enrichment system is provided with precipitation measuring points according to the present invention at the input point for the operating gas and at the output or at other points in the system it is additionally possible, with the given operating data for the system, such as, for example, the throughput quantity and the operating hours, to determine any possible irregularities in the gas passing through the system from the comparison of the measured results, i.e., the radioactive radiation measurements, from a plurality of these measuring points.

As can be seen in the gamma spectrum curve of FIG. 3 which shows the gamma spectrum of highly enriched uranium with approximately 93% uranium 235, the line 1 (thorium 231) rises with respect to the other lines with increasing enrichment of the operating gas in uranium 235; this curve is shown and described in A. v. Baeckmann "Bestimmung des U-235-Gehalts in abgereichertem oder schwach angereichertem Uran durch γ-Spektrometrie" [Determination of the U-235 content in depleted or weakly enriched uranium by γ-spectrometry] Gesellschaft fur Kernforschung, Karlsruhe, Germany; external report 10/66-1 November 1966 (Institute for Radio Chemistry). Consequently the measured spectrum may be simply compared with a control curve representing the desired enrichment to determine whether the gas should be permitted to continue to dwell in the system or not in order to further enrich the gas in U-235. This permits a very simple control of the degree of enrichment or a determination of deviations with respect to given operating values.

In addition to simple operation the monitoring method according to the present invention also offers a possibility for the so-called "history control", i.e., with the gamma-spectrometric measurements of the filters containing charges including thorium fluoride traces it is possible when the system is shut down to subsequently and accurately determine which isotope composition the gas had when it flowed through the filter. The evaluation of the gamma spectra takes place in a known manner with the aid of calibration curves and under consideration of the decay equations for the uranium isotopes and their secondary products.

Referring now to FIG. 4 there is shown an example of an enrichment system for gaseous $UF_6$ which includes a linear cascade of 10 separating stages $S_1$–$S_{10}$. Such linear cascades are well known in the art, see for example the above-mentioned U.S. Pat. Nos. 2,951,354 and 2,947,472. The cascade is provided with a feed line F, product discharge line P and a waste discharge line W. The charge of $UF_6$ in its starting composition is fed into the enrichment system via the feed line F and depending on the size of the cascade, requires a certain time until it normally leaves the system through the product discharge line P or the waste discharge line W. During this travel or dwell period, the U-235 concentration of the process gas is changed, with the degree of change depending on the mode of operation of the system. At the same time that the concentration of U-235 is being changed during this period of dwell in the system, the proportions of the secondary products or nuclides in the process gas, which are a result of the natural decay of the uranium, are increased. As indicated above, the concentration of the secondary products is an indication of the period of dwell of the process gas charge in the system. Therefore, according to the invention the change in the concentration of the secondary products or daughter nuclides is determined at one or more control points.

In order to perform these measurements as shown in FIG. 4, the cascade is provided with precipitation or control points $C_F$, $C_p$ and $C_w$ in the feed line F, the discharge line P and the discharge line W respectively. At each of the control points a small quantity of the process gas is precipitated or deposited in a known manner, e.g., by means of cooled surfaces or filtration, and the precipitated products are analyzed by gamma spectroscopy by means of analyzers $A_F$, $A_p$ and $A_w$ respectively to provide respective gamma-spectra curves. By comparing the measured gamma spectra curves of the gas in the feed, product and waste streams the system can thus be monitored and controlled without direct access to the separating stages being required. For example, by comparing the gamma spectra determined by the analyzer $A_p$ with the gamma spectra for a saturated charge as shown for example in FIG. 2, it can be determined whether the age of the charge is less than 28 days and thus whether longer periods of dwell in conjunction with repeated enrichment (recycling) would produce higher degress of enrichment than provided in normal operation (history control) of the system. The comparison of the gamma spectra and the subsequent control of the period of dwell or enrichment of the $UF_6$ can be performed normally or automatically, e.g., by a process control computer. For example, as shown in FIG. 4 the output of analyzer $A_p$ may be fed to a process control computer, of conventional design, which simply compares the measured gamma spectra with the gamma spectrum shown in FIG. 2 and then controls the position of a valve V in the product line P to return all or part of the product at the output of stage $S_1$ to the input of a preceeding stage of the cascade (stage $S_2$ in the illustrated example) if it is determined from the comparison that a longer period of dwell of the process gas $UF_6$ would produce a higher degree of enrichment. The other analyzers may, of course, be connected to similar process control computers which control various other flow control elements, e.g., valves, pumps, etc. of the system or preferably the outputs of the various analyzers may be fed to a single process control computer which controls all of the variables of the system.

The control points, utilized according to the invention, are not limited to the feed, product or precipitation or waste lines F, P or W but may also be provided within the cascade at so-called step lines for the process gas. FIG. 4 shows such a control point $C_{St}$ in the bottom portion of the linear cascade and its associated analyzer $A_{St}$.

It will be understood that the above description of the present invention is susceptible to various modifications, changes and adaptations, and the same are intended to be comprehended within the meaning and range of equivalents of the appended claims.

What is claimed is:

1. In a method of controlling the operation enrichment systems in which gaseous uranium compounds are processed, the improvement comprises:
    separating, at least one precipitation point in the system, a small quantity of the process gas compound and its secondary products;
    measuring the radioactive radiation of the separated process gas compound and its secondary products;
    identifying the age of the process gas compound passing through the precipitation point with the radioactive radiation measurements; and
    controlling a parameter of the system with the accumulated data of the process gas and its secondary products.

2. The method according to claim 1, wherein said controlled parameter is the degree of enrichment of the process gas compound in the system.

3. The method according to claim 1, wherein the controlled parameter is the period of dwell of the process gas compound in the system.

4. The method according to claim 1, wherein: said step of separating includes separating the thorium secondary products at the precipitation point of the system; said step of measuring includes measuring the gamma spectra of the precipitated process gas compound and said thorium secondary products; and said step of identifying includes comparing the measured gamma spectra of the secondary products with a control curve of the gamma spectra for said secondary products.

5. The method according to claim 4, wherein the 30 keV line of thorium 231, the 63 or 92 keV line of thorium 234 and the 184 keV line of uranium 235 are compared to determine the degree of enrichment and the period of dwell of the process gas compound in the system.

6. The method according to claim 5 wherein the measured gamma spectrum is compared with a control curve corresponding to a process gas which has reached saturation activity.

* * * * *